(12) United States Patent
Miyazaki et al.

(10) Patent No.: US 8,040,624 B1
(45) Date of Patent: Oct. 18, 2011

(54) LENS DRIVE DEVICE

(75) Inventors: Kiyoshi Miyazaki, Nagano (JP);
Tatsuki Wade, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 13/071,706

(22) Filed: Mar. 25, 2011

(30) Foreign Application Priority Data

Mar. 25, 2010 (JP) .................................. 2010-070526

(51) Int. Cl.
*G02B 7/02* (2006.01)
*G02B 15/14* (2006.01)

(52) U.S. Cl. ........ 359/824; 359/814; 359/694; 359/696; 396/133

(58) Field of Classification Search .......... 359/694–698, 359/811, 814, 824, 827; 396/55, 133, 144, 396/439; 348/240, E5.052; 336/222; 310/12.08; 720/683
See application file for complete search history.

(56) References Cited

U.S. PATENT DOCUMENTS

| | | | | |
|---|---|---|---|---|
| 7,518,812 B2 * | 4/2009 | Sue et al. | ...................... | 359/824 |
| 7,751,134 B2 * | 7/2010 | Sata et al. | ...................... | 359/824 |
| 7,916,412 B2 * | 3/2011 | Li et al. | ......................... | 359/824 |
| 2010/0060999 A1 * | 3/2010 | Higuchi | ......................... | 359/814 |
| 2010/0149668 A1 * | 6/2010 | Wade et al. | .................... | 359/824 |

FOREIGN PATENT DOCUMENTS

JP 2009-198948 A 9/2009

\* cited by examiner

*Primary Examiner* — Loha Ben
(74) *Attorney, Agent, or Firm* — Cantor Colburn LLP (57) ABSTRACT

A lens drive device for use with at least one lens may include a movable body holding a lens, a fixed body movably holding the movable body, and a drive mechanism for driving the movable body in the optical axis direction. The drive mechanism may include a drive coil fixed to the movable body and a plurality of drive magnets which is fixed to the fixed body and magnetized so that magnetic poles are different from each other in the optical axis direction. The fixed body may include an outer peripheral side magnetic member and an end face side magnetic member and an inner peripheral face of the outer peripheral side magnetic member and a side face of the drive magnet are faced each other through a predetermined space. The drive coil is disposed between the drive magnet and the inner peripheral face of the outer peripheral side magnetic member.

21 Claims, 10 Drawing Sheets

LENS DRIVE DEVICE

CROSS REFERENCE TO RELATED APPLICATION

The present invention claims priority under 35 U.S.C. §119 to Japanese Application No. 2010-70526 filed Mar. 25, 2010, the entire content of which is incorporated herein by reference.

FIELD OF THE INVENTION

At least an embodiment of the present invention may relate to a lens drive device for use with at least one lens which is used in a relatively small camera that is mounted on a cellular phone or the like.

BACKGROUND

A lens drive device has been conventionally known in which a photographing lens for a camera that is mounted on a cellular phone or the like is driven. The lens drive device is provided with a lens holder, which holds a plurality of lenses and is moved in an optical axis direction, and a drive mechanism part for driving the lens holder in the optical axis direction (see, for example, Japanese Patent Laid-Open No. 2009-198948). In the lens drive device described in this Patent Literature, a drive coil which is wound around in a square shape is fixed to an outer peripheral side of the lens holder and two drive magnets are disposed so as to interpose the drive coil from both sides in the optical axis direction.

In recent years, in a market of a camera which is mounted on a cellular phone or the like, requirement for making a camera thinner has been further increased and, in order to meet the requirement, requirement for making a lens drive device used in a camera thinner has been also increased. However, in the lens drive device described in the above-mentioned Patent Literature, two drive magnets are disposed so as to interpose the drive coil which is fixed to the lens holder from both sides in the optical axis direction. Therefore, when the device is made thinner, a space in the optical axis direction between two drive magnets becomes narrow. As a result, in the lens drive device, when the device is made thinner, it is difficult to secure a required stroke of the lens.

SUMMARY

In view of the problem described above, at least an embodiment of the present invention may advantageously provide a lens drive device which is capable of being made thinner in the optical axis direction while securing a stroke of the lens.

According to at least an embodiment of the present invention, there may be provided a lens drive device including a movable body which holds a lens and is movable in an optical axis direction of the lens, a fixed body which movably holds the movable body in the optical axis direction, and a drive mechanism for driving the movable body in the optical axis direction. The drive mechanism includes a drive coil which is fixed to the movable body, and a plurality of drive magnets which is formed in a substantially columnar shape or a substantially plate shape and fixed to the fixed body, and the drive magnet is magnetized so that a magnetic pole of one end face is different from a magnetic pole of the other end face in the optical axis direction. The fixed body includes an outer peripheral side magnetic member, which is formed of magnetic material and formed in a substantially tube-like shape and structures an outer peripheral face of the fixed body, and an end face side magnetic member which is formed of magnetic material and to which the one end face of the drive magnet is fixed. An inner peripheral face of the outer peripheral side magnetic member and a side face of the drive magnet are faced each other through a predetermined space. The outer peripheral side magnetic member, the end face side magnetic member and the drive magnet are disposed so that a magnetic field is formed so as to pass through the drive magnet, the end face side magnetic member and the outer peripheral side magnetic member and returned to the other end face of the drive magnet from the inner peripheral face of the outer peripheral side magnetic member, or returned to the inner peripheral face of the outer peripheral side magnetic member from the other end face of the drive magnet, and the drive coil is disposed between the other end face side of the drive magnet and the inner peripheral face of the outer peripheral side magnetic member.

In the lens drive device for use with at least one lens in accordance with an embodiment of the present invention, an inner peripheral face of the outer peripheral side magnetic member which is formed in a substantially tube-like shape and structures an outer peripheral face of the fixed body is disposed so as to face a side face of the drive magnet which is formed in a substantially columnar shape or a substantially plate shape through a predetermined space and the drive coil is disposed between the other end face side of the drive magnet in the optical axis direction and the inner peripheral face of the outer peripheral side magnetic member. Therefore, even when the movable body is moved in the optical axis direction, the drive magnet and the drive coil are not interfered with each other. Accordingly, even when the lens drive device is made thinner in the optical axis direction, a stroke of the movable body in the optical axis direction, in other words, a stroke of the lens in the optical axis direction is secured. In other words, in accordance with the embodiment of the present invention, the lens drive device is made thinner while securing a stroke of the lens.

In accordance with an embodiment of the present invention, the outer peripheral side magnetic member and the end face side magnetic member are formed in an integral manner. In this case, for example, the fixed body is provided with a cover member which is formed in a substantially bottomed tube-like shape in which the end face side magnetic member is a bottom part and the outer peripheral side magnetic member is a tube part that is integrally formed with the bottom part, and the end face side magnetic member structures an end face on an object to be photographed or imaged side of the lens drive device. According to this structure, leakage of a magnetic flux from a portion between the end face side magnetic member and the outer peripheral side magnetic member is prevented. Therefore, a magnetic flux density passing through the drive coil which is disposed between the other end face side of the drive magnet and the inner peripheral face of the outer peripheral side magnetic member is enhanced. As a result, even when the drive magnet and the drive coil are made thinner, a driving force of the drive mechanism is secured and thus the lens drive device can be further made thinner.

In accordance with an embodiment of the present invention, an end face of the end face side magnetic member is abutted with the inner peripheral face of the outer peripheral side magnetic member. According to this structure, leakage of a magnetic flux from a portion between the end face side magnetic member and the outer peripheral side magnetic member is restrained and thus a magnetic flux density passing through the drive coil is enhanced. Therefore, even when the drive magnet and the drive coil are made thinner, a driving force of the drive mechanism is secured.

In accordance with an embodiment of the present invention, the inner peripheral face of the outer peripheral side magnetic member and the side face of the drive magnet which are faced each other are substantially parallel to each other. According to this structure, directions of magnetic lines of force generated from the drive magnet are easily directed from the other end face of the drive magnet to the inner peripheral face of the outer peripheral side magnetic member, or easily directed from the inner peripheral face of the outer peripheral side magnetic member to the other end face of the drive magnet and thus a magnetic flux density passing through the drive coil is enhanced. Therefore, even when the drive magnet and the drive coil are made thinner, a driving force of the drive mechanism is secured.

In accordance with an embodiment of the present invention, the other end face of the drive magnet is fixed with a second end face side magnetic member which is formed of magnetic material, and the magnetic field is directed from the inner peripheral face of the outer peripheral side magnetic member to the other end face of the drive magnet through the second end face side magnetic member, or the magnetic field is directed from the other end face of the drive magnet to the inner peripheral face of the outer peripheral side magnetic member through the second end face side magnetic member. When the second end face side magnetic member is fixed to the other end face of the drive magnet, a magnetic flux is concentrated on the second end face side magnetic member. Therefore, according to this structure, a magnetic flux density passing through the drive coil is enhanced. In this case, it is preferable that a width in the optical axis direction of the drive coil is set to be a width in which the second end face side magnetic member is always located and faced on an inner peripheral side of the drive coil over a moving range of the movable body.

In accordance with an embodiment of the present invention, a shape of the drive magnet when viewed in the optical axis direction is substantially the same as a shape of the second end face side magnetic member when viewed in the optical axis direction. In comparison with a case that a shape of the drive magnet when viewed in the optical axis direction is different from a shape of the second end face side magnetic member when viewed in the optical axis direction, when the shape of the drive magnet when viewed in the optical axis direction is substantially the same as the shape of the second end face side magnetic member when viewed in the optical axis direction, directions of magnetic lines of force generated from the drive magnet are easily directed from the other end face of the drive magnet to the inner peripheral face of the outer peripheral side magnetic member, or easily directed from the inner peripheral face of the outer peripheral side magnetic member to the other end face of the drive magnet. Therefore, according to this structure, a magnetic flux density passing through the drive coil is further enhanced.

In accordance with an embodiment of the present invention, the drive mechanism is provided with one drive coil which is wound around in a tube-like shape and disposed along the inner peripheral face of the outer peripheral side magnetic member. According to this structure, in comparison with a case that a plurality of drive coils is disposed so as to correspond to a plurality of drive magnets, a structure of the lens drive device is simplified. Further, according to this structure, in comparison with a case that a plurality of drive coils is disposed, handling of end parts of a conducting wire structuring the drive coil is simplified and thus manufacturing steps for the lens drive device are simplified. Specifically, it may be structured that the movable body is provided with a sleeve which holds a lens holder to which the lens is fixed, the sleeve is formed with two flange parts which are separated from each other through a predetermined space in the optical axis direction, the flange part which is disposed on a side of the end face side magnetic member is formed with an arrangement hole within which a part of the drive magnet is disposed, and the drive coil is fixed between the two flange parts of the sleeve so as to be fixed on an outer peripheral side of the arrangement hole.

In accordance with an embodiment of the present invention, a shape of the lens drive device when viewed in the optical axis direction is formed in a substantially square shape or a substantially rectangular shape, and the drive magnet is disposed at four corners of the lens drive device. In this case, the drive magnet may be disposed at four corners of the lens drive device which is liable to be dead spaces. Therefore, the size of the lens drive device whose shape when viewed in the optical axis direction is formed in a substantially square shape or a substantially rectangular shape can be reduced.

Further, in this case, it is preferable that the drive magnet is formed in a substantially triangular prism shape. According to this structure, even when spaces of four corners of the lens drive device are made relatively small, the drive magnet is disposed at four corners of the lens drive device. Therefore, the size of the lens drive device can be further reduced. Further, according to this structure, the inner peripheral face of the outer peripheral side magnetic member and the side face of the drive magnet can be disposed to be substantially parallel to each other and thus, as described above, a magnetic flux density passing through the drive coil can be enhanced. In this case, the drive mechanism may be provided with one drive coil which is wound around in a tube-like shape and disposed along the inner peripheral face of the outer peripheral side magnetic member, or the drive mechanism may be provided with four drive coils each of which is wound around in a substantially triangular tube-like shape and faces the side face of the drive magnet through a predetermined gap space.

In accordance with an embodiment of the present invention, a shape of the lens drive device for use with at least one lens when viewed in the optical axis direction is formed in a substantially rectangular shape, and the drive magnet is disposed on both sides of the lens drive device in a direction substantially parallel to a long side of the lens drive device when viewed in the optical axis direction. In this case, the size of the lens drive device is further reduced in a direction substantially parallel to a short side of the lens drive device when viewed in the optical axis direction.

Further, in this case, it is preferable that the drive magnet is formed in a substantially rectangular prism shape. According to this structure, the inner peripheral face of the outer peripheral side magnetic member and the side face of the drive magnet can be disposed to be substantially parallel to each other and thus, as described above, a magnetic flux density passing through the drive coil can be enhanced. In this case, specifically, it may be structured that the movable body is provided with a sleeve which holds a lens holder to which the lens is fixed, and the drive mechanism is provided with one drive coil which is fixed to the sleeve and wound around in a substantially rectangular shape which is longer in a long side direction of the lens drive device when viewed in the optical axis direction. Alternatively, the drive mechanism may be provided with two drive coils each of which is wound around in a substantially rectangular tube shape when viewed in the optical axis direction and fixed to the sleeve so that an inner peripheral face of the drive coil faces the side face of the drive magnet through a predetermined gap space.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7(A) and 7(B) are explanatory views showing a schematic structure of a lens drive device for use with at least one lens in accordance with another embodiment of the present invention.

FIGS. 9(A) and 9(B) are explanatory views showing a schematic structure of a lens drive device for use with at least one lens in accordance with another embodiment of the present invention.

DETAILED DESCRIPTION OF THE PREFERRED EMBODIMENTS

An embodiment of the present invention will be described below with reference to the accompanying drawings.

Figure 1:
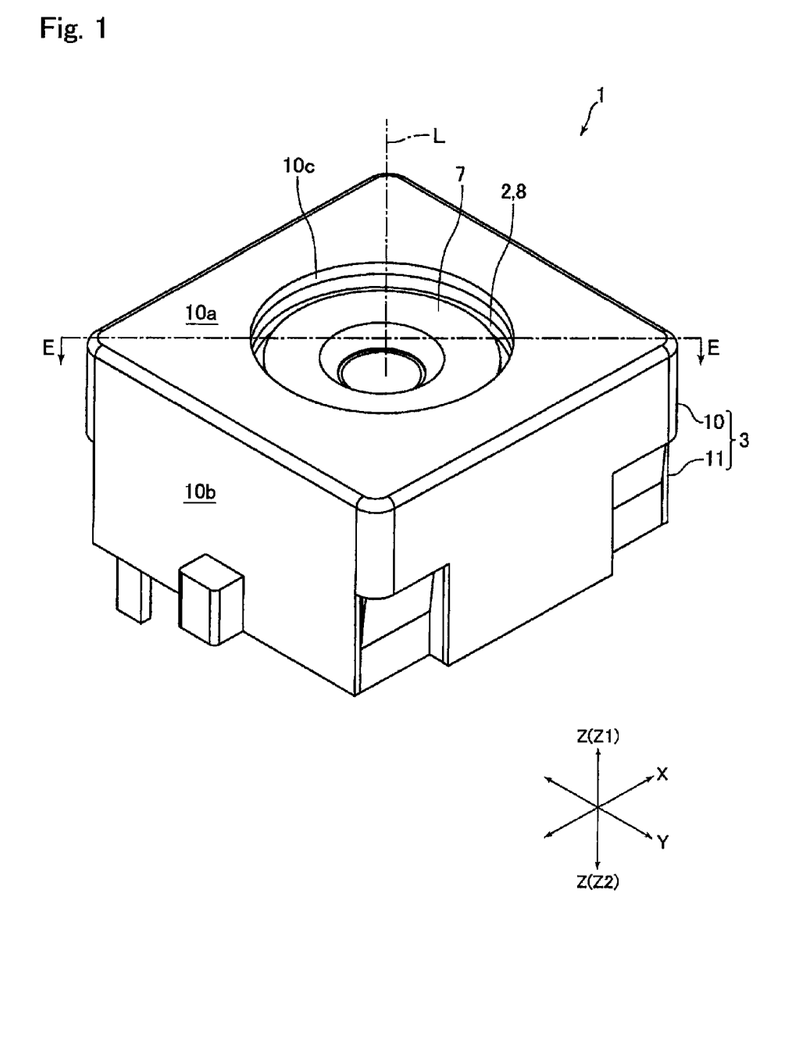
FIG. 1 is a perspective view showing a lens drive device for use with at least one lens in accordance with an embodiment of the present invention.
Figure 2:
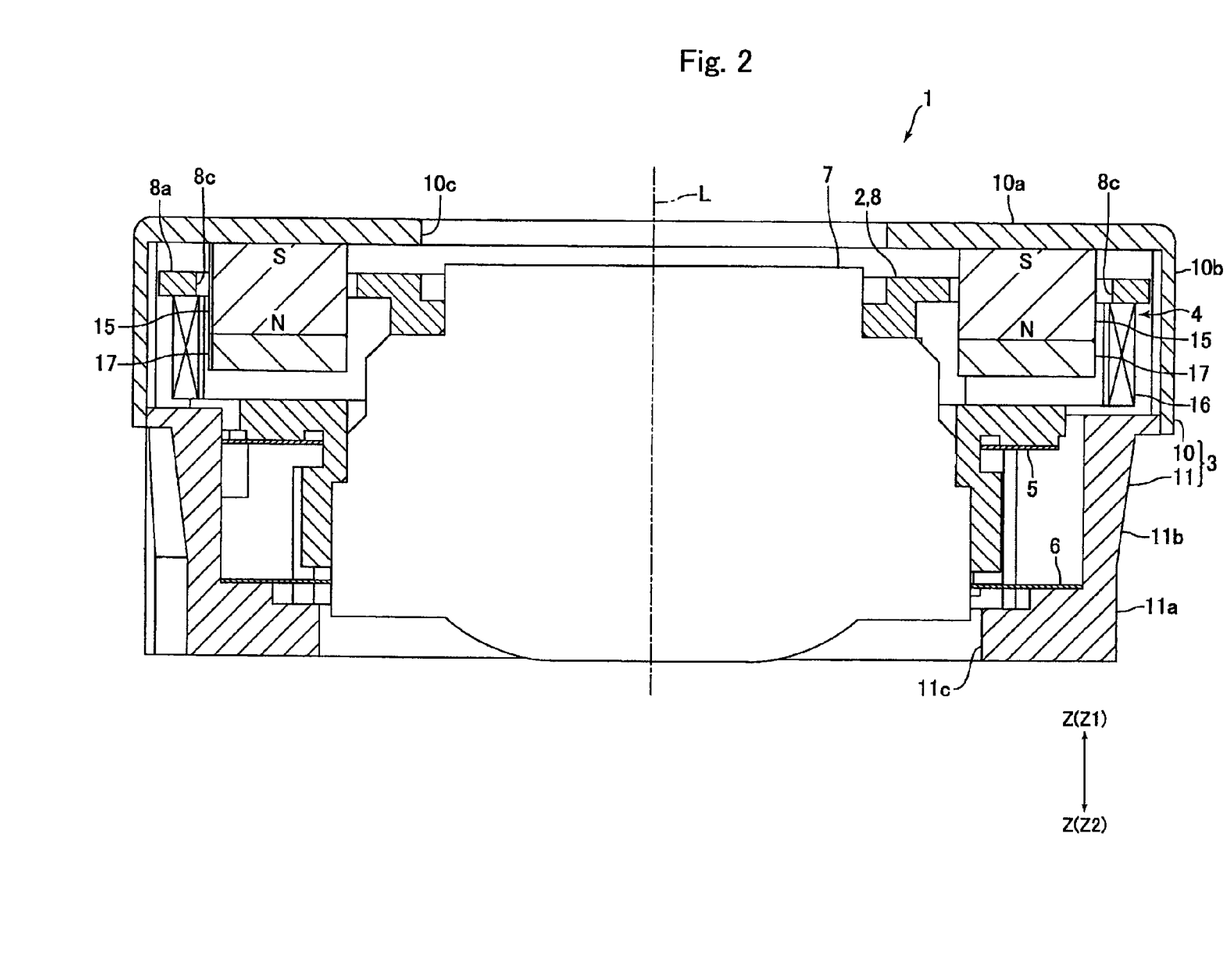
FIG. 2 is a cross-sectional view showing the lens drive device for use with at least one lens which is cut by the "E-E" line in FIG. 1.
Figure 3:
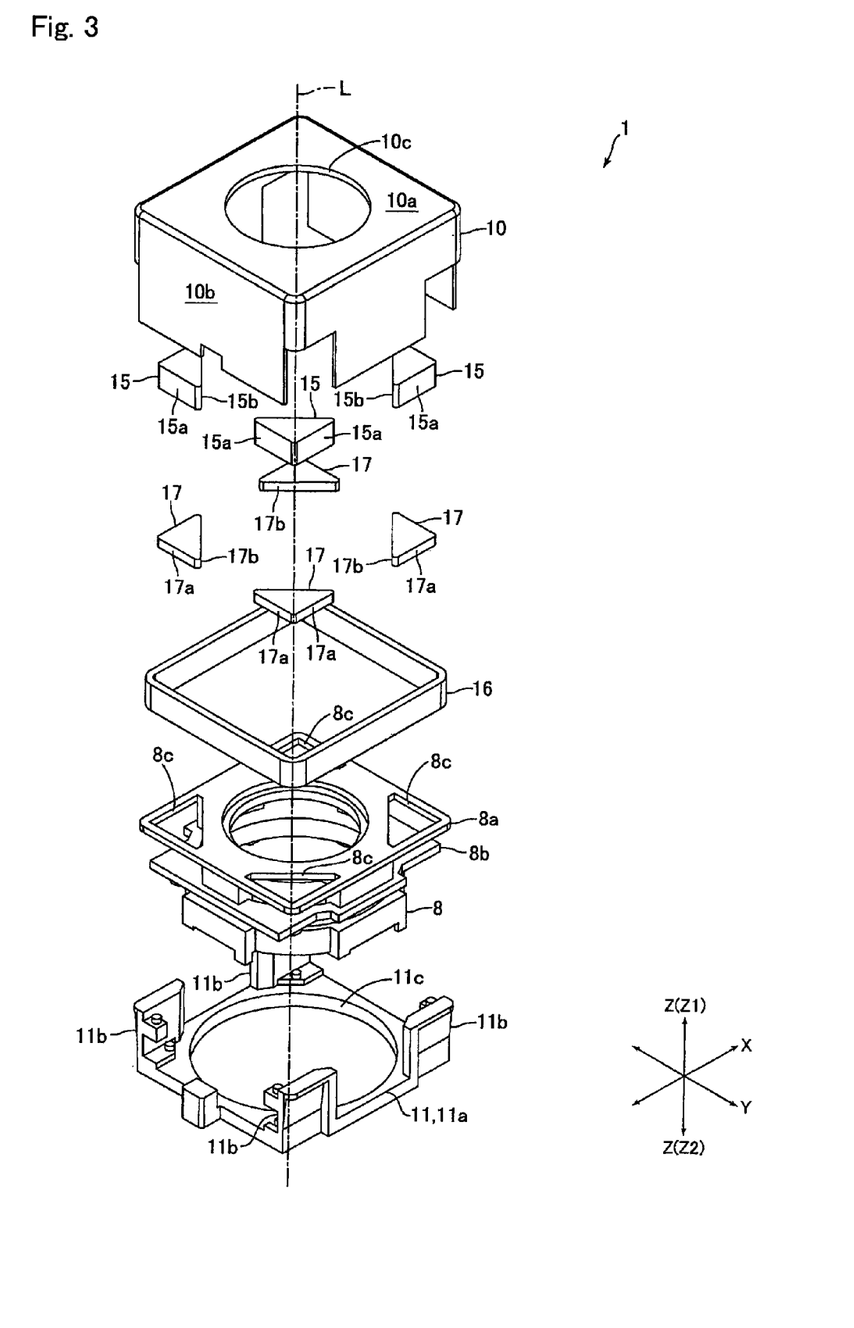
FIG. 3 is an exploded perspective view showing the lens drive device for use with at least one lens in FIG. 1.

FIG. 1 is a perspective view showing a lens drive device for use with at least one lens 1 in accordance with an embodiment of the present invention. FIG. 2 is a cross-sectional view showing the lens drive device 1 which is cut by the "E-E" line in FIG. 1. FIG. 3 is an exploded perspective view showing the lens drive device 1 in FIG. 1. In the following description, as shown in FIG. 1 and the like, three directions perpendicular to each other are set to be "X" direction, "Y" direction and "Z" direction. The "X" direction is a right and left direction, the "Y" direction is a front and rear direction, and the "Z" direction is an up-and-down direction. Further, a "Z1" direction side in FIG. 1 is an "upper" side and a "Z2" direction side is a "lower" side.

A lens drive device 1 for use with at least one lens in this embodiment is mounted on a relatively small camera which is used in a cellular phone, a drive recorder, a monitor camera system or the like. The lens drive device 1 is, as shown in FIG. 1, formed in a roughly rectangular prism shape as a whole. In other words, the lens drive device 1 is formed in a roughly rectangular shape when viewed in a direction of an optical axis "L" of a lens for photography or imaging including digital images and video for example (optical axis direction). In this embodiment, the lens drive device 1 is formed in a roughly square shape when viewed in the optical axis direction. Further, four side faces of the lens drive device 1 are substantially parallel to the right and left direction or the front and rear direction.

In this embodiment, the "Z" direction (up-and-down direction) is substantially coincided with the optical axis direction. Further, in the camera on which the lens drive device 1 in this embodiment is mounted, an imaging element not shown is disposed on its lower side and an object to be photographed or imaged on an upper side is photographed or imaged. In other words, in this embodiment, the upper side ("Z1" direction side) is an object to be photographed or imaged side (object side) and the lower side ("Z2" direction side) is an opposite-to-object side (imaging element side, image side).

As shown in FIGS. 1 and 2, the lens drive device 1 is provided with a movable body 2, which holds a lens for photography or imaging and is movable in the optical axis direction, a fixed body 3 which movably holds or moveable mounts the movable body 2 in the optical axis direction so that the moveable body 2 may move in relation to the fixed body 3 in the optical axis direction, and a drive mechanism 4 for driving the movable body 2 in the optical axis direction. The movable body 2 is movably held by the fixed body 3 through flat springs 5 and 6 (see FIG. 2). In FIG. 3, the flat springs 5 and 6 are not shown.

The movable body 2 is provided with a sleeve 8 which holds a lens holder 7 to which at least one lens or a plurality of lenses is fixed. The fixed body 3 is provided with a cover member 10 which structures four side faces (outer peripheral face) of the lens drive device 1 and a base member 11 which structures an end face on an opposite-to-object side of the lens drive device 1. In FIG. 3, the lens holder 7 is not shown.

The lens holder 7 is formed in a substantially cylindrical tube shape having a stepped part. The at least one or a plurality of lenses whose shape when viewed in the optical axis direction is substantially circular is fixed on an inner peripheral side of the lens holder 7. The sleeve 8 is, for example, formed of resin material and formed in roughly tube-like shape. The sleeve 8 holds the lens holder 7 on its inner peripheral side. In other words, an outer peripheral face of the lens holder 7 is fixed to an inner peripheral face of the sleeve 8. Further, the sleeve 8 is formed with two flange parts 8a and 8b in a separated state from each other through a predetermined space in the up-and-down direction as shown in FIG. 3. The flange parts 8a and 8b are formed so that their external shapes are formed in a substantially square shape. The flange part 8a disposed on the upper side is formed with arrangement holes 8c within which parts of drive magnets 15 structuring the drive mechanism 4 are disposed are formed so as to penetrate in the up-and-down direction.

The cover member 10 is formed of magnetic material and formed in a substantially rectangular tube shape with a bottom (substantially bottomed rectangular tube shape) which is provided with a bottom part 10a and a tube part 10b. The bottom part 10a is disposed on the upper side and structures an end face on the object to be photographed or imaged side of the lens drive device 1. A circular through hole 10c is formed at a center of the bottom part 10a. The cover member 10 is disposed so as to surround an outer peripheral side of the drive mechanism 4 and the movable body 2.

The base member 11 is formed of resin material and provided with a base part 11a which is formed in a roughly square-shaped flat plate and standing-up parts 11b which are stood up toward the upper side from four corners of the base part 11a. A circular through hole 11c is formed at a center of the base part 11a. The base member 11 is attached to a lower end side of the cover member 10.

The flat springs 5 and 6 are structured of a movable body side fixing part which is fixed to the sleeve 8, fixed body side fixing parts which are fixed to the standing-up parts 11b of the base member 11, and spring parts which connect the movable body side fixing part with the fixed body side fixing parts. The flat springs 5 and 6 are disposed on a lower side with respect to the flange part 8b disposed on the lower side. In this embodiment, the flat spring 5 is fixed to the sleeve 8, i.e., the under face of the flange part 8b and the base member 11 in a resiliently bent state so that, when an electric current is not supplied to the drive coil 16, a reference face formed on an upper face of the base part 11a and a lower end face of the sleeve 8 are abutted with each other and the movable body 2 is located at a predetermined reference position.

The drive mechanism 4 is provided with four drive magnets 15 in a substantially triangular prism shape which are disposed at four corners of the lens drive device 1 (specifically, four corners on the inner side of the cover member 10) and one drive coil 16 which is wound around on an outer peripheral side of the sleeve 8. A detailed structure of the drive mechanism 4 will be described below.

Figure 4:
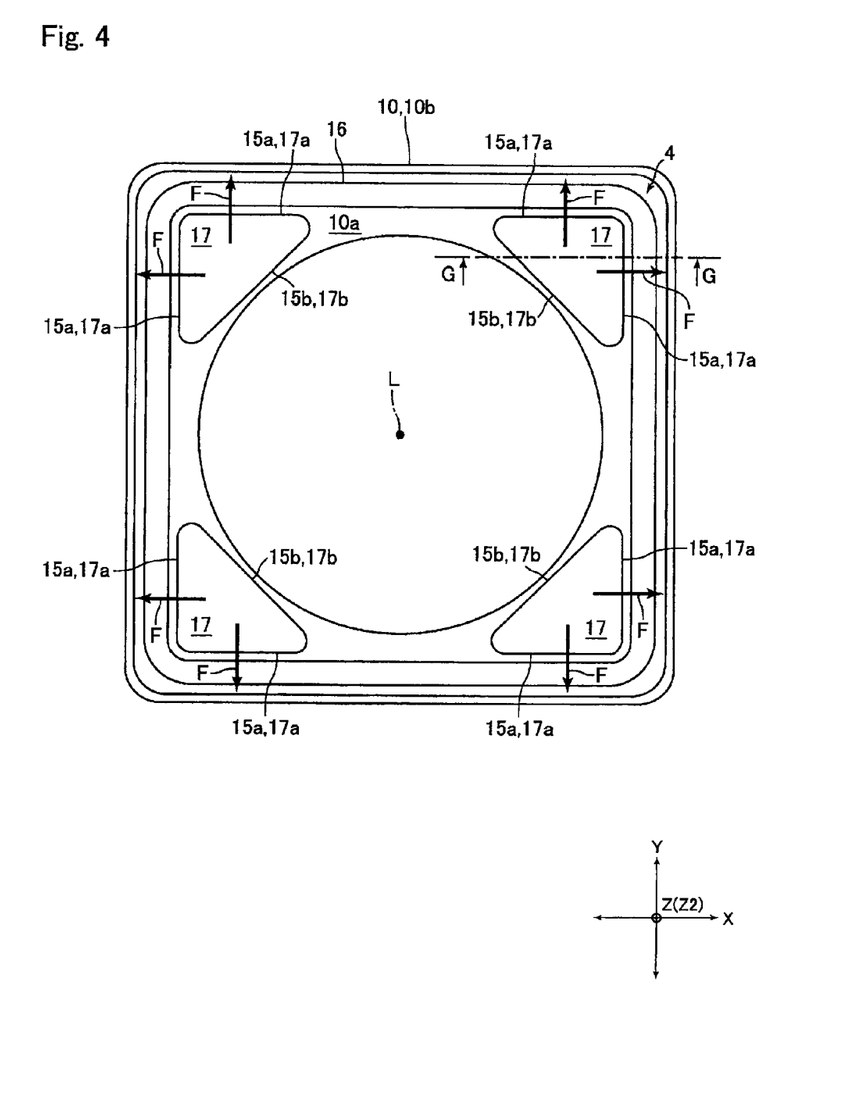
FIG. 4 is a plan view showing the lens drive device for use with at least one lens in FIG. 1 from which a movable body, a flat spring, a base member and the like are detached and which is viewed from an opposite-to-object side.
Figure 5:
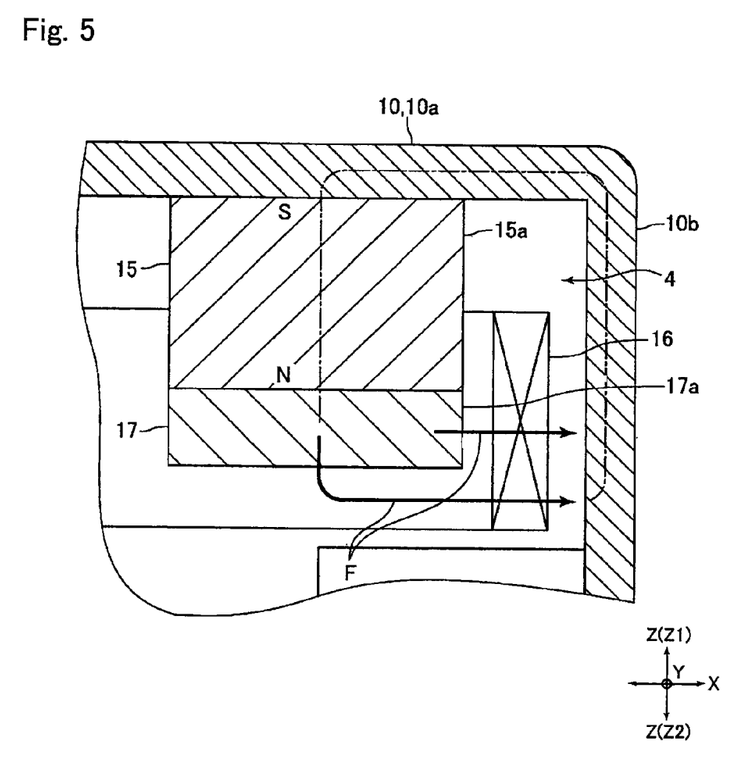
FIG. 5 is a cross-sectional view showing the "G-G" cross section in FIG. 4 where an object to be photographed or imaged side is located on an upper side.

FIG. 4 is a plan view showing the lens drive device 1 in FIG. 1 from which the movable body 2, the flat springs 5 and 6, the base member 11 and the like are detached and which is viewed from an opposite-to-object side. FIG. 5 is a cross-sectional view showing the "G-G" cross section in FIG. 4 where an object to be photographed or imaged side is located on an upper side.

The drive magnet 15 is formed so that its shape when viewed in the up-and-down direction is a substantially rectangular equilateral triangle. The drive magnet 15 is provided with two first side faces (first side face) 15a which are formed in a rectangular shape and are substantially parallel to the optical axis "L" and perpendicular to each other, and one second side face (second side face) 15b which is formed in a rectangular shape, substantially parallel to the optical axis "L" and connected with the two first side faces 15a.

The drive magnet 15 is disposed so that its first side face 15a faces an inner peripheral face of the tube part 10b of the cover member 10 through a predetermined space so as to be substantially parallel to each other. In other words, two drive magnets 15 which are disposed at diagonal positions on the inner side of the cover member 10 are disposed so that their second side faces 15b are faced each other. Further, four drive magnets 15 are fixed to the bottom part 10a of the cover member 10. Specifically, upper end faces of the four drive magnets 15 are fixed to an under face of the bottom part 10a by an adhesive or the like in a state that their upper end faces are abutted with the under face of the bottom part 10a. Further, the upper end face of each of the four drive magnets 15 is completely covered by the bottom part 10a. The bottom part 10a in this embodiment is an end face side magnetic member to which one end face of each of the drive magnets 15 is fixed, and the tube part 10b is an outer peripheral side magnetic member which structures the outer peripheral face of the fixed body 3.

A lower end face of the drive magnet 15 is fixed with a magnetic member 17 which is formed of magnetic material. The magnetic member 17 is formed in a flat plate shape whose shape when viewed in the up-and-down direction is in a substantially rectangular equilateral triangle shape that is similarly to the drive magnet 15. The magnetic member 17 is provided with two first end faces (first end face) 17a perpendicular to each other and one second end face (second end face) 17b which is connected with the two first end faces 17a. The magnetic member 17 is fixed to the lower end face of the drive magnet 15 so that its thickness direction is substantially coincided with the up-and-down direction. Further, the magnetic member 17 is fixed to the lower end face of the drive magnet 15 so that the first end faces 17a are disposed to be substantially the same flat faces as the first side faces 15a of the drive magnet 15 and the second end face 17b is disposed to be substantially the same flat face as the second side face 15b of the drive magnet 15. The magnetic member 17 in this embodiment is a second end face side magnetic member which is fixed to the other end face of the drive magnet 15.

The drive magnet 15 is magnetized in two poles in the up-and-down direction so that a magnetic pole of the upper end face and a magnetic pole of the lower end face are different from each other. For example, the drive magnet 15 is magnetized such that the upper end face of the drive magnet 15 is an "S"-pole and the lower end face of the drive magnet 15 is an "N"-pole. Therefore, as shown in FIG. 5, in the lens drive device 1, a magnetic field "F" is formed which passes the tube part 10b and the bottom part 10a of the cover member 10, the drive magnet 15 and the magnetic member 17 to be returned to the inner peripheral face of the tube part 10b from the under face and the first end face 17a of the magnetic member 17. In other words, in the lens drive device 1, a magnetic field "F" is formed which passes the tube part 10b and the bottom part 10a of the cover member 10 and the drive magnet 15 to be returned from the lower end face of the drive magnet 15 to the inner peripheral face of the tube part 10b through the magnetic member 17. The magnetic field "F" is, as shown in FIG. 4, returned to the inner peripheral face of the tube part 10b, which is disposed to be substantially parallel to the first side face 15a of the drive magnet 15 and the first end face 17a of the magnetic member 17, from the under face and the first end face 17a of the magnetic member 17. The magnetic field "F" is also returned to the inner peripheral face of the tube part 10b from the vicinity of the abutting part of the lower end face of the drive magnet 15 with the upper face of the magnetic member 17 but the magnetic field "F" is not shown in FIG. 5.

The drive coil 16 is wound around in a flat and substantially rectangular tube shape whose shape viewed in the up-and-down direction is a substantially square shape. A width of the drive coil 16 in the up-and-down direction is wider than a thickness of the magnetic member 17. The drive coil 16 is fixed to the outer peripheral face of the sleeve 8. Specifically, the drive coil 16 is fixed between the flange parts 8a and 8b of the sleeve 8 and disposed on an outer peripheral side of the arrangement hole 8c provided in the flange part 8a by adhesion or the like.

The drive coil 16 is, as shown in FIG. 4, disposed along the inner peripheral face of the tube part 10b of the cover member 10. Four corners and their vicinity portions of the drive coil 16 are disposed within a space between the first side face 15a of the drive magnet 15 and the first end face 17a of the magnetic member 17 and the tube part 10b of the cover member 10. Further, as shown in FIG. 5, the four corners and their vicinity portions of the drive coil 16 are disposed in the magnetic field "F" which is directed from the under face and the first end face 17a of the magnetic member 17 to the inner peripheral face of the tube part 10b. In this embodiment, the drive coil 16 is disposed so that the magnetic member 17 is always disposed on the inner peripheral side of the drive coil 16 over a moving range of the movable body 2. In other words, a width in the up-and-down direction (optical axis direction) of the drive coil 16 is set so that, over the moving range of the movable body 2, the lower end face of the drive coil 16 is not moved to the upper side with respect to the under face of the magnetic member 17 and, in addition, the upper end face of the drive coil 16 is not moved to the lower side with respect to the upper face of the magnetic member 17. When an electric current is supplied to the drive coil 16, the movable body 2 is moved in the up-and-down direction (optical axis direction) by an operation between the drive magnets 15 and the drive coil 16.

As described above, in this embodiment, the four corners and their vicinity portions of the drive coil 16 are disposed within a space between the first side face 15a of the drive magnet 15 and the first end face 17a of the magnetic member 17 and the tube part 10b of the cover member 10. Therefore, even when the movable body 2 is moved in the optical axis direction, the drive magnets 15 and the drive coil 16 are not interfered with each other. Accordingly, in this embodiment, even when the lens drive device 1 is made thinner in the up-and-down direction, a stroke of the lens held by the movable body 2 is secured. In other words, in this embodiment, the lens drive device 1 can be made thinner while securing a stroke of the lens.

In this embodiment, the bottom part 10a with which the upper end face of the drive magnet 15 is abutted is integrally formed with the tube part 10b. Therefore, magnetic flux is prevented from leaking out from a portion between the bottom part 10a and the tube part 10b to the outside of the lens drive device 1. Further, in this embodiment, the first side face 15a of the drive magnet 15 is substantially parallel to the inner peripheral face of the tube part 10b. Therefore, directions of the magnetic lines of force which are generated by the drive magnet 15 are easily directed to the directions from the under face and the first end face 17a of the magnetic member 17 toward the inner peripheral face of the tube part 10b. Accordingly, in this embodiment, the magnetic flux density which is directed from the under face and the first end face 17a of the magnetic member 17 to the inner peripheral face of the tube part 10b, (in other words, magnetic flux density passing through the drive coil 16) is enhanced. As a result, in this embodiment, even when the drive magnet 15 and the drive coil 16 are made thinner, a driving force of the drive mechanism 4 is secured and thus the lens drive device 1 can be further made thinner.

Especially, in this embodiment, the magnetic member 17 is fixed to the lower end face of the drive magnet 15 and the shape of the drive magnet 15 and the shape of the magnetic member 17 are substantially the same as each other when viewed in the up-and-down direction. According to consideration of the present inventors, when the magnetic member 17 is fixed to the lower end face of the drive magnet 15, a magnetic flux is concentrated on the magnetic member 17. Further, according to consideration of the present inventors, when the shape of the drive magnet 15 and the shape of the magnetic member 17 viewed in the up-and-down direction are different from each other, directions of the magnetic lines of force which are generated from the drive magnet 15 are hard to be directed from the under face and the first end face 17a of the magnetic member 17 to the inner peripheral face of the tube part 10b. However, when the shape of the drive magnet 15 and the shape of the magnetic member 17 viewed in the up-and-down direction are substantially the same as each other, directions of the magnetic lines of force which are generated from the drive magnet 15 are easily directed from the under face and the first end face 17a of the magnetic member 17 to the inner peripheral face of the tube part 10b. Therefore, in this embodiment, the density of the magnetic flux which is directed to the inner peripheral face of the tube part 10b from the under face and the first end face 17a of the magnetic member 17 is enhanced effectively. As a result, in this embodiment, even when the drive magnet 15 and the drive coil 16 are further made thinner, a driving force of the drive mechanism 4 can be secured.

In this embodiment, the four corners and their vicinity portions of the drive coil 16 are disposed in the magnetic field "F" which is directed from the under face and the first end face 17a of the magnetic member 17 to the inner peripheral face of the tube part 10b. Therefore, even when the movable body 2 is moved to the upper direction from the reference position where the lower end face of the sleeve 8 is abutted with the reference face which is formed on the upper face of the base member 11, a driving force of the drive mechanism 4 is hard to be lowered. Accordingly, in this embodiment, the movable body 2 can be moved relatively larger from the reference position to the upper direction by a driving force of the drive mechanism 4. As a result, in this embodiment, a stroke of the lens is easily secured and a stable driving force of the drive mechanism 4 can be obtained over a stroke of the lens.

In this embodiment, the drive magnets 15 are disposed at four corners of the lens drive device 1 whose shape viewed in the optical axis direction is a substantially square shape. Therefore, the drive magnets 15 can be disposed at four corners of the lens drive device 1 which may be dead spaces in the lens drive device 1 that drives the lens whose shape viewed in the optical axis direction is a substantially circular shape. Further, in this embodiment, the drive magnet 15 is formed in a substantially triangular prism shape. Therefore, even when spaces of the four corners of the lens drive device 1 are set to be reduced, the drive magnets 15 can be disposed. Accordingly, in this embodiment, the size of the lens drive device 1 can be reduced.

First Modified Embodiment of Lens Drive Device

Figure 6:
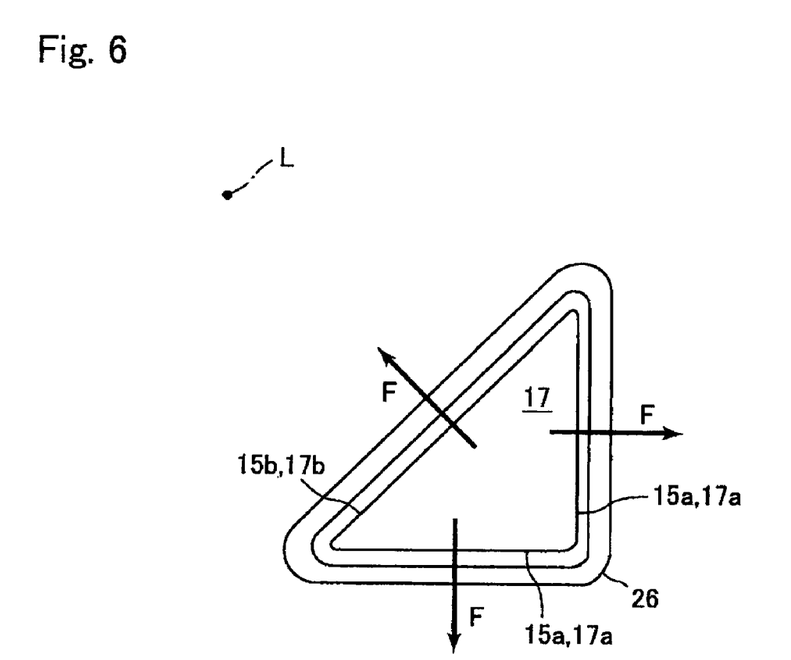
FIG. 6 is an explanatory view showing a structure of a drive coil in accordance with another embodiment of the present invention.

FIG. 6 is an explanatory view showing a structure of a drive coil 26 in accordance with another embodiment of the present invention.

In the embodiment described above, the drive mechanism 4 is provided with one drive coil 16 which is disposed along the inner peripheral face of the tube part 10b of the cover member 10. However, the drive mechanism 4 may be provided, instead of the drive coil 16, with four drive coils 26 as shown in FIG. 6, each of which is wound around in a substantially triangular tube-like shape and its inner peripheral face is disposed so as to face the side face of the drive magnet 15 through a predetermined gap space. In the first modified embodiment, the drive coil 26 is wound around so that its shape viewed in the up-and-down direction is a substantially rectangular equilateral triangle shape. Further, four drive coils 26 are fixed to the sleeve 8 so that the inner peripheral face of the drive coil 26 and the side face of the drive magnet 15 are substantially parallel to each other with a predetermined gap space therebetween.

Even in the first modified embodiment, effects similar to the above-mentioned embodiment can be obtained. Further, in the first modified embodiment, magnetic flux on the second end face 17b side is utilized for driving of the movable body 2 and thus a driving force of the drive mechanism 4 is further enhanced. In the embodiment described above, only one drive coil 16 is utilized and thus, in comparison with the first modified embodiment, the structure of the lens drive device 1 is simplified. Further, in comparison with the first modified embodiment, in the embodiment described above, end parts of a conducting wire of only one drive coil 16 are required to be handled and thus handling of end parts of a conducting wire structuring the drive coil 16 is simplified. Therefore, manufacturing steps for the lens drive device 1 can be simplified.

Second Modified Embodiment of Lens Drive Device

Figure 7A:
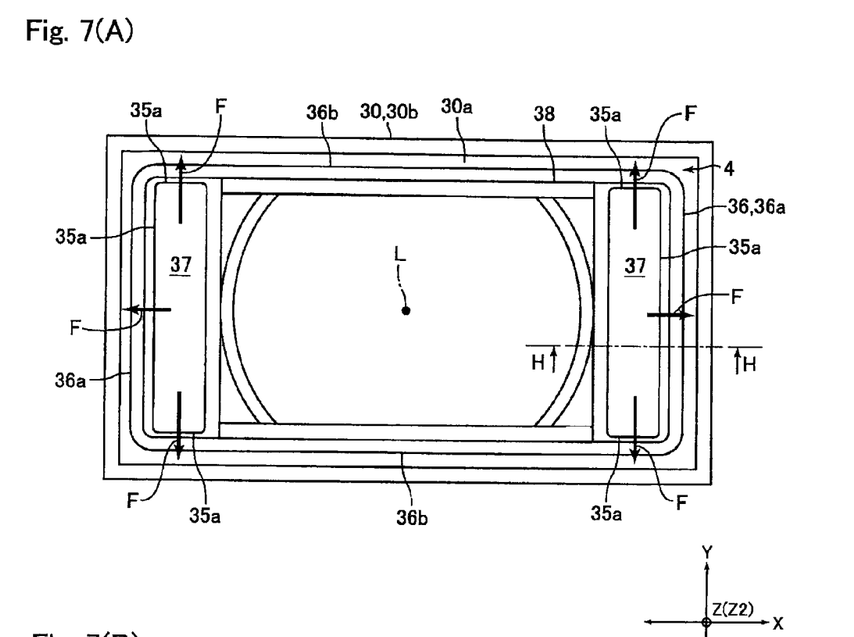
FIG. 7(A) is an explanatory view showing a schematic structure of the lens drive device which is viewed from an opposite-to-object side and FIG. 7(B) is a cross-sectional view showing the "H-H" cross section in FIG. 7(A) where an object to be photographed or imaged side is located on an upper side.
Figure 7B:
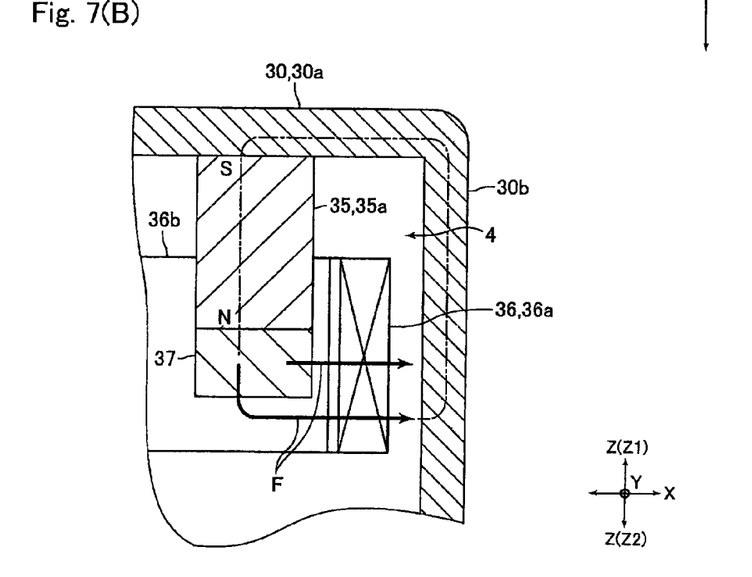
Figure 8:
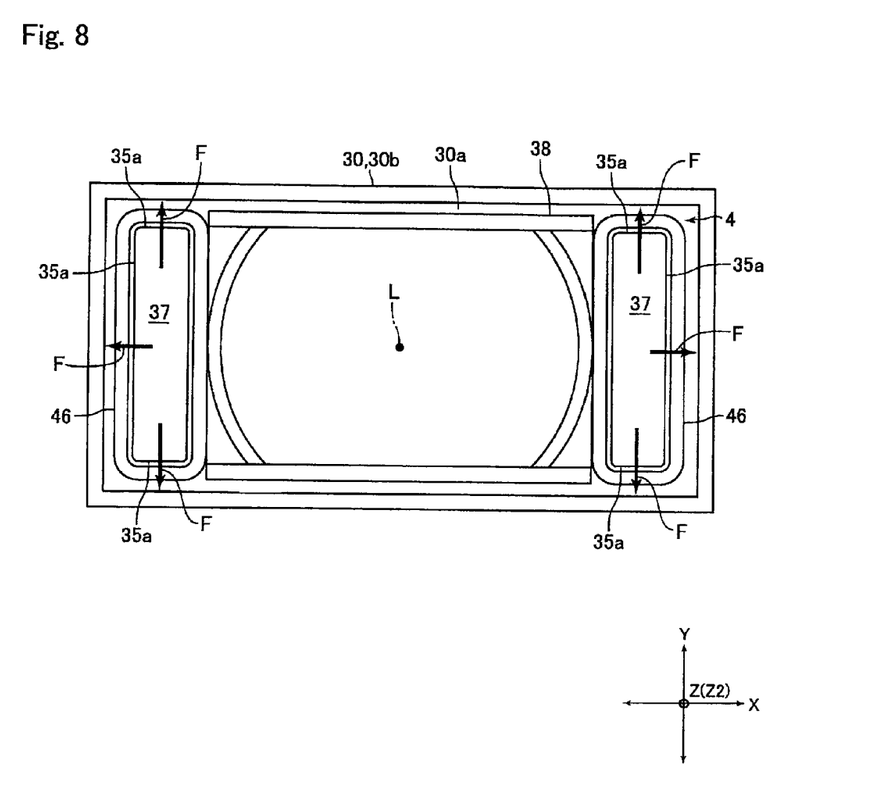
FIG. 8 is an explanatory view showing a schematic structure of a lens drive device for use with at least one lens in accordance with another embodiment of the present invention which is viewed from an opposite-to-object side.

FIGS. 7(A) and 7(B) are explanatory views showing a schematic structure of a lens drive device 1 in accordance with another embodiment of the present invention. FIG. 7(A) is an explanatory view showing a schematic structure of the lens drive device 1 which is viewed from an opposite-to-object side and FIG. 7(B) is a cross-sectional view showing the "H-H" cross section in FIG. 7(A) where an object to be photographed or imaged side is located on an upper side. FIG. 8 is an explanatory view showing a schematic structure of a lens drive device 1 in accordance with another embodiment of the present invention which is viewed from an opposite-to-object side.

In the embodiment described above, the lens drive device 1 is formed so that its shape viewed in the optical axis direction is a substantially square shape. Further, the drive magnet 15 formed in a substantially triangular prism shape is disposed at four corners of the lens drive device 1. However, the present invention is not limited to this embodiment. For example, the lens drive device 1 may be formed so that its shape viewed in the optical axis direction is a substantially rectangular shape. Further, in this case, as shown in FIG. 7(A), a drive magnet 35 may be formed in a substantially rectangular prism shape and disposed on both sides of the lens drive device in a direction substantially parallel to a long side of the lens drive device 1 when viewed in the optical axis direction. The lens drive device 1 in accordance with the second modified embodiment is provided with a sleeve 38 corresponding to the sleeve 8 of the embodiment described above and a cover member 30 corresponding to the cover member 10.

The drive magnet 35 is formed in a substantially rectangular shape whose shape viewed in the up-and-down direction is elongated in a short side direction of the lens drive device 1. The drive magnet 35 is disposed so that its three side faces 35a and an inner peripheral face of the tube part 30b of the cover member 30 are substantially parallel and faced to each other with a predetermined space therebetween. Further, the drive magnet 35 is fixed to an under face of the bottom part 30a of the cover member 30 in an abutted state. A lower end face of the drive magnet 35 is fixed to a magnetic member 37 which is formed of magnetic material. The magnetic member 37 is formed in a flat plate-like shape whose shape viewed in the up-and-down direction is a substantially rectangular shape that is similar to the drive magnet 35. In the second modified embodiment, the bottom part 30a is an end face side magnetic member to which one end face of the drive magnet 35 is fixed and the tube part 30b is an outer peripheral side magnetic member which structures an outer peripheral face of the fixed body 3. Further, the magnetic member 37 is a second end face side magnetic member which is fixed to the other end face of the drive magnet 35.

The drive magnet 35 is magnetized in two poles in the up-and-down direction so that a magnetic pole of the upper end face and a magnetic pole of the lower end face are different from each other. Therefore, as shown in FIG. 7(B), in the lens drive device 1 in accordance with the second modified embodiment, a magnetic field "F" is formed which passes the tube part 30b and the bottom part 30a of the cover member 30, the drive magnet 35 and the magnetic member 37 to be returned to the inner peripheral face of the tube part 30b from the under face and the end face of the magnetic member 37. In other words, in the lens drive device 1 in accordance with the second modified embodiment, a magnetic field "F" is formed which passes the tube part 30b and the bottom part 30a of the cover member 30 and the drive magnet 35 to be returned from the lower end face of the drive magnet 35 to the inner peripheral face of the tube part 30b through the magnetic member 37. The magnetic field "F" is, as shown in FIG. 7(A), directed from the under face and the end face of the magnetic member 37 to the inner peripheral face of the tube part 30b which is disposed so as to be substantially parallel and faced to the three side faces 35a of the drive magnet 35. Similarly to the above-mentioned embodiment, the magnetic field "F" is also returned to the inner peripheral face of the tube part 30b from the vicinity of abutting part of the lower end face of the drive magnet 35 with the upper face of the magnetic member 37.

A drive coil 36 is wound around so that its shape viewed in the up-and-down direction is a substantially rectangular shape which is elongated in a long side direction of the lens drive device 1. The drive coil 36 is provided with short side parts 36a and long side parts 36b which are longer than the short side part 36a. The drive coil 36 is fixed to an outer peripheral face of the sleeve 38 so as to be along the inner peripheral face of the tube part 30b. Both end sides of the long side parts 36b and the short side part 36a of the drive coil 36 are disposed within a space between three side faces 35a of the drive magnet 35 and the inner peripheral face of the tube part 30b. Further, the both end sides of the long side parts 36b and the short side part 36a are disposed within the magnetic field "F" which is directed from the under face and the end faces of the magnetic member 37 to the inner peripheral face of the tube part 30b.

Also in the lens drive device 1 in accordance with the second modified embodiment, effects similar to the above-mentioned embodiment can be obtained. Further, in the lens drive device 1 in accordance with the second modified embodiment, the drive magnets 35 are disposed on both sides of the lens drive device 1 in a direction substantially parallel to the long side of the lens drive device 1 when viewed in the optical axis direction. Therefore, the size of the lens drive device 1 can be further reduced in a direction substantially parallel to the short side of the lens drive device 1 when viewed in the optical axis direction. In accordance with an embodiment of the present invention, instead of the drive coil 36, as shown in FIG. 8, it may be structured that two drive coils 46 which are wound around in a substantially rectangular tube shape and whose inner peripheral side is disposed so as to face the side face of the drive magnet 35 through a predetermined space are fixed to an outer peripheral face of the sleeve 38.

Third Modified Embodiment of Lens Drive Device

Figure 9A:
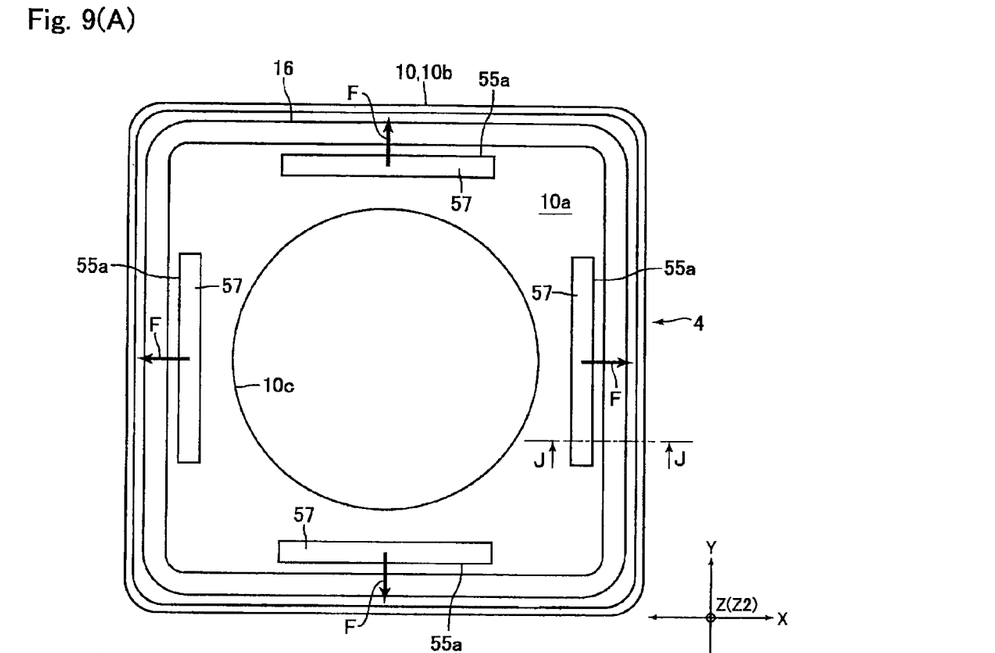
FIG. 9(A) is an explanatory view showing a schematic structure of the lens drive device which is viewed from an opposite-to-object side and FIG. 9(B) is a cross-sectional view showing the "J-J" cross section in FIG. 9(A) where an object to be photographed or imaged side is located on an upper side.
Figure 9B:
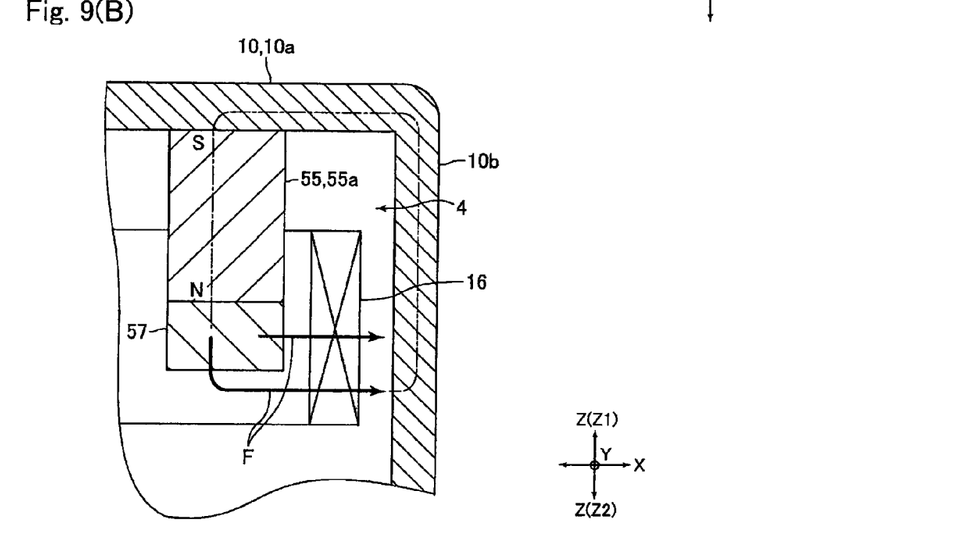

FIGS. 9(A) and 9(B) are explanatory views showing a schematic structure of a lens drive device 1 in accordance with another embodiment of the present invention. FIG. 9(A) is an explanatory view showing a schematic structure of the lens drive device 1 which is viewed from an opposite-to-object side and FIG. 9(B) is a cross-sectional view showing the "J-J" cross section in FIG. 9(A) where an object to be photographed or imaged side is located on an upper side.

In the embodiment described above, the drive magnet 15 which is formed in a substantially triangular prism shape is disposed at four corners of the lens drive device 1. However, the present invention is not limited to this embodiment. For example, as shown in FIG. 9(A), a drive magnet 55 which is formed in a substantially rectangular plate shape may be disposed on each of four side faces of the lens drive device 1.

In the third modified embodiment, the drive magnet 55 is disposed so that its one side face 55a and an inner peripheral face of a tube part 10b of a cover member 10 are in substantially parallel and faced to each other with a predetermined space therebetween. Further, the drive magnet 55 is fixed to an under face of a bottom part 10a of the cover member 10 in an abutted state. A lower end face of the drive magnet 55 is fixed to a magnetic member 57 which is formed of magnetic material. The magnetic member 57 is formed in a flat plate-like shape which is, similarly to the drive magnet 55, substantially rectangular shape when viewed in the up-and-down direction. In the third modified embodiment, the magnetic member 57 is a second end face side magnetic member which is fixed to the other end face of the drive magnet 55.

The drive magnet 55 is magnetized in two poles in the up-and-down direction so that a magnetic pole of the upper end face and a magnetic pole of the lower end face are different from each other. Therefore, similarly to the above-mentioned embodiment, in the lens drive device 1 in accordance with the third modified embodiment, a magnetic field "F" is formed which passes the tube part 10b and the bottom part 10a, the drive magnet 55 and the magnetic member 57 to be returned to the inner peripheral face of the tube part 10b from the under face and the end face of the magnetic member 57. The magnetic field "F" is, as shown in FIG. 9(A), directed from the under face and the end face of the magnetic member 57 to the inner peripheral face of the tube part 10b which is disposed so as to be substantially parallel and faced to the side face 55a of the drive magnet 55. Similarly to the above-mentioned embodiment, the magnetic field "F" is also returned to the inner peripheral face of the tube part 10b from the vicinity of abutting part of the lower end face of the drive magnet 55 with the upper face of the magnetic member 57.

A part of the drive coil 16 is disposed within a space between the side face 55a of the drive magnet 55 and the inner peripheral face of the tube part 10b. Further, the part of the drive coil 16 is disposed in the magnetic field "F" which is directed from the under face and the end face of the magnetic member 57 to the inner peripheral face of the tube part 10b. Also in the third modified embodiment, effects similar to the above-mentioned embodiment can be obtained.

Fourth Modified Embodiment of Lens Drive Device

Figure 10:
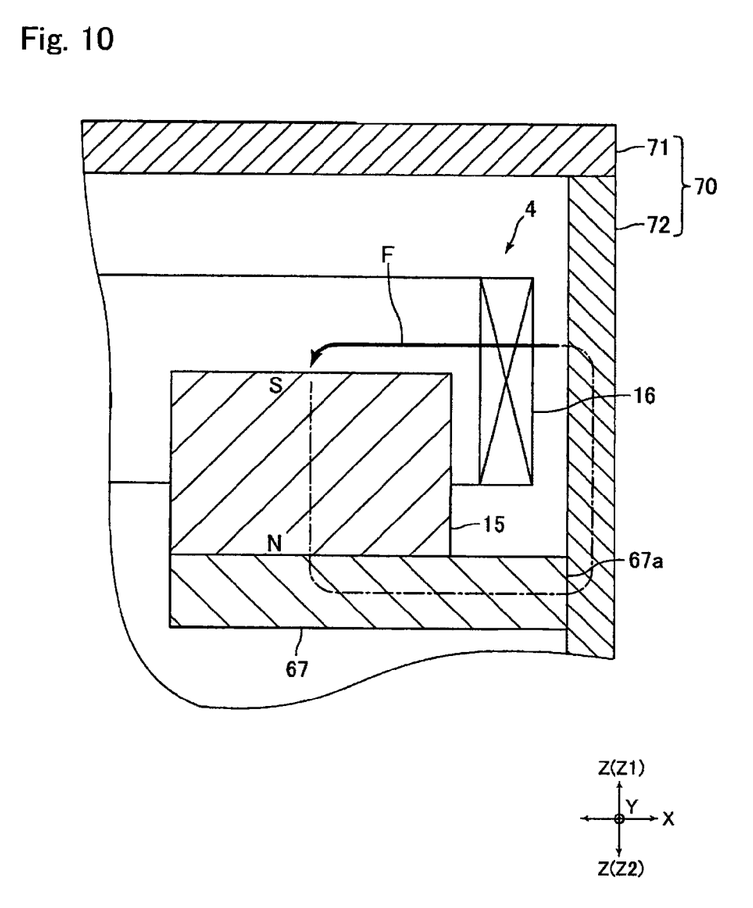
FIG. 10 is an enlarged sectional view showing a part of a lens drive device for use with at least one lens in accordance with another embodiment of the present invention.

FIG. 10 is an enlarged sectional view showing a part of a lens drive device 1 in accordance with another embodiment of the present invention.

In the embodiment described above, the upper end face of the drive magnet 15 is fixed to the under face of the bottom part 10a in an abutted state with the under face of the bottom part 10a. However, the present invention is not limited to this embodiment. For example, as shown in FIG. 10, a magnetic member 67 may be formed so that an end face 67a of the magnetic member 67 which is fixed to a lower end face of the drive magnet 15 is abutted with an inner peripheral face of a tube part 72 of a cover member 70. In this case, the end face 67a is fixed to the inner peripheral face of the tube part 72 and a space is formed between an upper end face of the drive magnet 15 and a bottom part 71 of the cover member 70.

In the fourth modified embodiment, a magnetic field "F" which is directed from the inner peripheral face of the tube part 72 to an upper end face of the drive magnet 15 is formed and thus four corners and their vicinity portions of the drive coil 16 are disposed in the magnetic field "F" which is directed from the inner peripheral face of the tube part 72 to the upper end face of the drive magnet 15. Further, in the fourth modified embodiment, the cover member 70 may be preferably structured of a bottom part 71 made of nonmagnetic material and a tube part 72 made of magnetic material so that magnetic lines of force generated from the drive magnet 15 are not directed from the bottom part 71 to the upper end face of the drive magnet 15. In this embodiment, the lens drive device 1 may be provided with four magnetic members 67 to which respective four drive magnets 15 are fixed, or one magnetic member 67 to which all of four drive magnets 15 are fixed. Also in the fourth modified embodiment, effects similar to the above-mentioned embodiment can be obtained.

In the fourth modified embodiment, the magnetic member 67 is an end face side magnetic member to which one end face of the drive magnet 15 is fixed, and the tube part 72 is an outer peripheral side magnetic member which structures the outer peripheral face of the fixed body 3. Further, in the fourth modified embodiment, a magnetic member is not fixed to the upper end face of the drive magnet 15 but a magnetic member may be fixed to the upper end face of the drive magnet 15. In this case, the magnetic member is a second end face side magnetic member.

Other Embodiments

In the embodiment described above, the magnetic member 17 is fixed to the lower end face of the drive magnet 15 but no magnetic member 17 is fixed to the lower end face of the drive magnet 15. In this case, a length of the drive magnet 15 is capable of being increased in the up-and-down direction by a thickness of the magnetic member 17 and thus a driving force of the drive mechanism 4 can be enhanced. Further, in this case, the magnetic member 17 is not required to be fixed to a lower end face of the drive magnet 15 and thus assembling steps for the lens drive device 1 can be simplified.

In the embodiment described above, the cover member 10 is structured of the bottom part 10a and the tube part 10b, and the bottom part 10a and the tube part 10b are formed in an integral manner. However, the present invention is not limited to this embodiment. For example, the bottom part made of magnetic material and the tube part made of magnetic material may be formed of separate members. In this case, the end face of the bottom part and the inner peripheral face of the tube part may be abutted with each other, or a gap space may be formed between the end face of the bottom part and the inner peripheral face of the tube part. Further, the under face of the bottom part and the upper end face of the tube part may be abutted with each other, or a gap space may be formed between the under face of the bottom part and the upper end face of the tube part. However, in order to restrain leakage of magnetic flux from a portion between the bottom part and the tube part to enhance magnetic flux density passing through the drive coil 16, it is preferable that the end face of the bottom part and the inner peripheral face of the tube part are abutted with each other, or the under face of the bottom part and the upper end face of the tube part are abutted with each other.

In the embodiment described above, the drive magnet 15 is formed in a substantially triangular prism shape, but the drive magnet 15 may be formed in a polygonal prism shape other than a substantially triangular prism shape or may be formed in a substantially circular cylinder shape or a substantially elliptical cylinder shape. Further, in the embodiment described above, the lens drive device 1 is formed in a roughly quadrangular shape when viewed in the optical axis direction. However, the lens drive device 1 may be formed in a roughly polygonal shape other than a roughly rectangular shape when viewed in the optical axis direction or may be formed in a roughly circular shape or elliptical shape when viewed in the optical axis direction. In these cases, the drive coil 16 may be wound around, for example, in a cylindrical tube shape or the like depending on the shape of the lens drive device 1 and the shape of the drive magnet 15 when viewed in the optical axis direction. Further, the drive coil 26 in the first modified embodiment may be also wound around, for example, in a cylindrical tube shape or the like depending on the shape of the lens drive device 1 and the shape of the drive magnet 15 when viewed in the optical axis direction.

In the embodiment described above, the shape of the drive magnet 15 when viewed in the up-and-down direction is substantially the same as the shape of the magnetic member 17. However, the shape of the drive magnet 15 when viewed in the up-and-down direction may be different from the shape of the magnetic member 17. Further, in the embodiment described above, the drive magnet 15 is disposed at four corners of the lens drive device 1. However, when a sufficient driving force for the movable body 2 is obtained, the drive magnet 15 may be disposed at three corners, two corners or only one corner of the four corners of the lens drive device 1.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device for use with at least one lens comprising:
    a movable body which holds the lens and is movable in an optical axis direction of the lens;
    a fixed body which movably holds the movable body in the optical axis direction; and
    a drive mechanism for driving the movable body in the optical axis direction;
    wherein the drive mechanism comprises:
        a drive coil which is fixed to the movable body; and
        a plurality of drive magnets which are formed in a substantially columnar shape or a substantially plate shape and fixed to the fixed body, each drive magnet being magnetized so that a magnetic pole of one end face thereof is different from a magnetic pole of another end face thereof in the optical axis direction;
    wherein the fixed body comprises:
        an outer peripheral side magnetic member which is formed of magnetic material and formed in a substantially tube-like shape and structures an outer peripheral face of the fixed body; and
        an end face side magnetic member which is formed of magnetic material and to which the one end face of the drive magnet is fixed;
    wherein an inner peripheral face of the outer peripheral side magnetic member and a side face of the drive magnet are faced each other through a predetermined space;
    wherein the outer peripheral side magnetic member, the end face side magnetic member and the drive magnet are disposed so that a magnetic field is formed so as to pass through the drive magnet, the end face side magnetic member and the outer peripheral side magnetic member and returned to the other end face of the drive magnet from the inner peripheral face of the outer peripheral side magnetic member, or returned to the inner peripheral face of the outer peripheral side magnetic member from the other end face of the drive magnet; and
    wherein the drive coil is disposed between the other end face side of the drive magnet and the inner peripheral face of the outer peripheral side magnetic member.

2. The lens drive device for use with at least one lens according to claim 1, wherein the outer peripheral side magnetic member and the end face side magnetic member are formed in an integral manner.

3. The lens drive device for use with at least one lens according to claim 2, wherein
    the fixed body is provided with a cover member which is formed in a substantially bottomed tube-like shape in which the end face side magnetic member is a bottom part and the outer peripheral side magnetic member is a tube part that is integrally formed with the bottom part, and
    the end face side magnetic member structures an end face on an object to be photographed or imaged side of the lens drive device.

4. The lens drive device for use with at least one lens according to claim 3, wherein the inner peripheral face of the outer peripheral side magnetic member and the side face of the drive magnet which are faced each other are substantially parallel to each other.

5. The lens drive device for use with at least one lens according to claim 4, further comprising a second end face side magnetic member which is formed of magnetic material and fixed to the other end face of the drive magnet,
    wherein the drive coil is formed in a tube-like shape so as to be movable between the side face of the drive magnet and the inner peripheral face of the outer peripheral side magnetic member, and
    wherein a width in the optical axis direction of the drive coil is set to be a width in which the second end face side magnetic member is always located on an inner peripheral side of the drive coil over a moving range of the movable body.

6. The lens drive device for use with at least one lens according to claim 5, wherein a shape of the drive magnet when viewed in the optical axis direction is substantially same as a shape of the second end face side magnetic member when viewed in the optical axis direction.

7. The lens drive device for use with at least one lens according to claim 1, wherein an end face of the end face side magnetic member is abutted with the inner peripheral face of the outer peripheral side magnetic member.

8. The lens drive device for use with at least one lens according to claim 1, further comprising a second end face side magnetic member which is formed of magnetic material and fixed to the other end face of the drive magnet,
    wherein the magnetic field is directed from the inner peripheral face of the outer peripheral side magnetic member to the other end face of the drive magnet through the second end face side magnetic member, or the magnetic field is directed from the other end face of the drive magnet to the inner peripheral face of the outer peripheral side magnetic member through the second end face side magnetic member.

9. The lens drive device for use with at least one lens according to claim 8, wherein the inner peripheral face of the outer peripheral side magnetic member and the side face of the drive magnet which are faced each other are substantially parallel to each other.

10. The lens drive device for use with at least one lens according to claim 9, wherein a shape of the drive magnet when viewed in the optical axis direction is substantially same as a shape of the second end face side magnetic member when viewed in the optical axis direction.

11. The lens drive device for use with at least one lens according to claim 1, wherein
a shape of the lens drive device when viewed in the optical axis direction is formed in a substantially square shape or a substantially rectangular shape, and
the drive magnet is disposed at each of four corners of the lens drive device.

12. The lens drive device for use with at least one lens according to claim 11, wherein the drive magnet is formed in a substantially triangular prism shape.

13. The lens drive device for use with at least one lens according to claim 12, wherein
the fixed body is provided with a cover member which is formed in a substantially bottomed tube-like shape in which the end face side magnetic member is a bottom part and the outer peripheral side magnetic member is a tube part that is integrally formed with the bottom part, and
the end face side magnetic member structures an end face on an object to be photographed or imaged side of the lens drive device.

14. The lens drive device for use with at least one lens according to claim 13, wherein the drive mechanism is provided with one drive coil which is wound around in a tube-like shape and disposed along the inner peripheral face of the outer peripheral side magnetic member.

15. The lens drive device for use with at least one lens according to claim 14, wherein
the movable body is provided with a sleeve which holds a lens holder to which the lens is fixed,
the sleeve is formed with two flange parts which are separated from each other in the optical axis direction through a predetermined space,
the flange part which is disposed on a side of the end face side magnetic member is formed with an arrangement hole within which a part of the drive magnet is disposed, and the drive coil is fixed between the two flange parts of the sleeve so as to be fixed on an outer peripheral side of the arrangement hole.

16. The lens drive device for use with at least one lens according to claim 13, wherein the drive mechanism is provided with four drive coils each of which is wound around in a substantially triangular tube-like shape and disposed so that an inner peripheral face of the drive coil faces the side face of the drive magnet through a predetermined gap space.

17. The lens drive device for use with at least one lens according to claim 1, wherein
a shape of the lens drive device when viewed in the optical axis direction is formed in a substantially rectangular shape, and
the drive magnet is disposed on both sides of the lens drive device in a direction substantially parallel to a long side of the lens drive device when viewed in the optical axis direction.

18. The lens drive device for use with at least one lens according to claim 17, wherein the drive magnet is formed in a substantially rectangular prism shape.

19. The lens drive device for use with at least one lens according to claim 18, further comprising a second end face side magnetic member which is formed of magnetic material and fixed to the other end face of the drive magnet,
wherein the drive coil is formed in a tube-like shape so as to be movable between the side face of the drive magnet and the inner peripheral face of the outer peripheral side magnetic member, and
wherein a width in the optical axis direction of the drive coil is set to be a width in which the second end face side magnetic member is always located on an inner peripheral side of the drive coil over a moving range of the movable body.

20. The lens drive device for use with at least one lens according to claim 19, wherein
the movable body is provided with a sleeve which holds a lens holder to which the lens is fixed, and
the drive mechanism is provided with one drive coil which is fixed to the sleeve and wound around in a substantially rectangular shape which is longer in a long side direction of the lens drive device when viewed in the optical axis direction.

21. The lens drive device for use with at least one lens according to claim 19, wherein
the movable body is provided with a sleeve which holds a lens holder to which the lens is fixed, and
the drive mechanism is provided with two drive coils each of which is wound around in a substantially rectangular tube shape when viewed in the optical axis direction and fixed to the sleeve so that an inner peripheral face of the drive coil faces the side face of the drive magnet through a predetermined gap space.

* * * * *